2,806,851

SUBSTITUTED HYDRAZINES

Harry H. Sisler and Andrew Donald Kelmers, Columbus, Ohio, assignors to The Ohio State University Research Foundation, Columbus, Ohio No Drawing. Application March 25, 1954, Serial No. 418,783

11 Claims. (Cl. 260—293)

The present invention relates to substituted hydrazines and more particularly to substituted hydrazines wherein the substituents are organic in nature. In another aspect, the present invention relates to methods of preparing anhydrous organic substituted hydrazines.

Among the substituted hydrazines which have been known and used are the various phenyl-hydrazines, hydrazobenzenes, hydrazides, semi-carbazides, pyrazolones, etc. The methods employed in preparing these compounds are as varied as the compounds themselves. For example, phenylhydrazine is prepared by reduction of a diazonium salt; hydrazobenzenes by reduction of nitrobenzene; semi-carbazides by electrolytic reduction of nitro-urea; 2,4-dinitro-phenyl hydrazine by the reaction of hydrazine with 1 chloro-2,4-dinitrobenzene. These reactions are carried out in aqueous phase, which means that the products must eventually be freed of water.

Because of their poly-functional nature, substituted hydrazines may find application in many places. For example, the azo dyes require a large quantity of such materials. These materials should also be useful in producing resins, coatings, adhesives, plastics, insecticides, fungicides, pharmaceuticals, textile treating agents, plasticizers, and rubber softeners. In addition, methyl hydrazine has been suggested as a rocket fuel.

Because of the high cost of preparing substituted hydrazines, they have never been manufactured in sufficient quantities to permit a real evaluation of their usefulness. However, the nature of the known compounds indicates that the possibilities are virtually endless.

It is a principal object of this invention to provide a general method for preparing substituted hydrazines. Another object is to provide a method for preparing anhydrous substituted hydrazines. It is another object to provide substituted hydrazines as new articles of manufacture. Other objects will be apparent from a consideration of the following detailed disclosure and claims.

In accordance with the present invention, we have provided a simple method of preparing substituted hydrazines which can be used as a general method for their preparation. Thus, it is possible to make these materials having controlled chemical properties.

The novel method of the present invention for preparing substituted hydrazines is to carry out the reaction of chloramine with an organic nitrogen-containing compound having a replaceable hydrogen attached to the nitrogen in the liquid phase and under substantially anhydrous conditions. Under the proper conditions, as will be set forth hereafter, the replaceable hydrogen on the nitrogen-containing compound combines with the chlorine atom of the chloramine molecule to effect direct union between the two nitrogen atoms to yield a substituted hydrazine.

This reaction of chloramine takes place with primary amines, secondary amines, imines, imides, and amides, all of which contain at least one replaceable hydrogen atom attached to the nitrogen atom.

The general reaction is illustrated by the equation $$RXNH + ClNH_2 \rightarrow RXNNH_2 + HCl \qquad (1)$$

where R is an organic radical and X is a hydrogen atom or an organic radical.

In the case of imino or imido compounds, the reaction is $$RC=NH + ClNH_2 \rightarrow RC=NNH_2 + HCl \qquad (2)$$

Since the reaction occurs with the nitrogen-borne hydrogen atom, the remaining portion of the molecule can be varied widely. The organic radicals may contain various constituents insofar as they are not reactive towards chloramine.

Because of the unstable character of chloramine it is preferred to form the chloramine as it is needed. It is known that gaseous chlorine will react almost instantaneously with gaseous ammonia under anhydrous conditions according to the following equation:

$$2NH_3 + Cl_2 \rightarrow ClNH_2 + NH_4Cl \qquad (3)$$

The equation shows that 2 mols of ammonia are required to react with each mol of chlorine. However, it has been demonstrated by Sisler and Mattair, Journal of the American Chemical Society 73, 1619 (1951), that the reaction requires a substantial excess of ammonia above the stoichiometric 2 mols. If less than the stoichimometric quantity of ammonia is used, the reaction may form the very explosive dichloramine or nitrogen trichloride. An excess of ammonia insures that only the monochloramine will be formed by the reaction. Furthermore, monochloramine is itself unstable and cannot be isolated in its pure form, although it is reasonably stable mixed with ammonia in the gaseous state. Therefore, an excess of ammonia is used to act as a diluent for the chloramine. The reaction between chlorine and ammonia requires very little equipment. It is known, however, that mixing of the chloramine with chlorine reduces the yield of chloramine and the reactor should be constructed so as to minimize the possibility of this occurring.

In practicing the present invention, it has been found convenient to form the monochloramine in an excess of ammonia and pass the chloramine-ammonia mixture immediately into the liquid nitrogen-containing compound to be substituted in the hydrazine molecule. Preferably, the ammonium chloride formed in the chloramine reaction is removed from the gaseous mixture of ammonia and chloramine before it is mixed with the nitrogen-containing compound.

Since the reaction between monochloramine and the nitrogen-containing compounds is carried out in liquid phase, this reaction has to be carried out at a temperature low enough to avoid an appreciable vapor pressure of chloramine above the liquid, or at an elevated pressure if loss of chloramine is to be avoided. As an alternative, the chloramine-ammonia mixture can be bubbled into the liquid nitrogen-containing compound at atmospheric conditions and the unreacted gases recirculated through the liquid to insure complete recovery. While the reaction between the nitrogen-containing compounds and monochloramine is not instantaneous, it requires only a few minutes. However, the liquid nitrogen-containing compounds normally dissolve a certain amount of chloramine and the reaction may continue after the chloramine introduction has been discontinued.

Since one of the products of the reaction of the present invention is HCl, the reaction should be carried out under such conditions that there is always present a sufficient amount of base to neutralize the HCl and maintain the mixture alkaline. If the nitrogen-containing compound is strongly basic in character, as the amines, the HCl can react with the nitrogen compound. However, since the monochloramine will almost always be diluted with ammonia gas, there will be sufficient ammonia present to neutralize the HCl, even if the nitrogen-containing compound is not sufficiently basic.

Because of the reactive nature of chloramine toward hydrazines, efficient operating practice requires that the concentration of chloramine in the liquid reaction mixture be maintained as low as is consistent with production requirements. The exact condition with respect to rate of addition and concentration will, of course, vary with the different nitrogen compounds used and will be dependent upon the rate of reaction for the particular compound and the conditions of temperature and pressure under which the reaction is conducted.

The final reaction mixture may contain unreacted nitrogen-containing compound, ammonia, ammonium chloride, and possibly small amounts of decomposition products of the various reactants.

The method used in recovering the substituted hydrazine from the final reaction mixture will, of course, depend upon the properties of the particular compound being recovered. In some instances, as with cyclohexylamine, cyclohexylamine hydrochloride precipitates as a crystalline solid, which can be removed by filtration. The cyclohexylhydrazine can be recovered from the filtrate by distillation. In other instances, the undesirable components may be crystallized from the admixture to leave a liquid from which the desirable derivative can be recovered by distillation. In still other instances, it may be necessary to add a relatively strong base to the mixture to liberate the desired substituted hydrazine. No general method can be prescribed for separating all classes of compounds but the particular method employed will be suggested by the properties of the mixture to be treated.

The present invention will be further illustrated by the following examples, in which chloramine was prepared by introducing gaseous chlorine axially into an open tube and at the same time introducing the large excess of anhydrous ammonia into the same end of the tube but through a plurality of orifices uniformly spaced around the axial chlorine inlet. A major portion of the tube away from the inlet end was packed with Pyrex glass wool to filter the ammonium chloride from the gaseous product. The effluent gases, comprising a mixture of ammonia, chloramine and nitrogen were immediately passed into the liquid nitrogen-containing compound whose hydrazine derivative was to be prepared.

EXAMPLE I

A gas bubbler was filled with 100 mls. of purified cyclohexylamine ($C_6H_{11}NH_2$). The bubbler was connected to the chloramine generator and the entire apparatus was flushed out with nitrogen. The ammonia and chlorine were then introduced into the chloramine reactor and the effluent gases were passed into the cyclohexylamine in the bubbler. The temperature of the liquid mixture was maintained at 21–27° C. by means of a water bath. After chloramine had been introduced for the predetermined time, the bubbler was disconnected from the chloramine generator and was allowed to stand in the water bath to insure complete reaction. After the standing period, the contents were analyzed for cyclohexylhydrazine (iodate method), and chloride (Volhard method), as described on page 157 of The Chemistry of Hydrazine by Audrieth and Ogg.

In another run, 150 mls. of purified cyclohexylamine was placed in the bubbler and chloramine was bubbled into the liquid at a rate of about 0.0008 mol per minute for about two hours. To insure completeness to the reaction, the solution in the bubbler was allowed to stand for about one hour at room temperature after the chloramine introduction had been discontinued. During the reaction, a white solid separated in the bubbler. After the reaction was complete, the solid was filtered from the liquid and dried. It had a melting point of about 203–204° C. Cyclohexylamine hydrochloride melts at 206–207° C. This indicates that the white solid was almost pure cyclohexylamine hydrochloride.

The liquid recovered as the filtrate consisted of cyclohexylamine containing cyclohexylhydrazine dissolved therein. This liquid was distilled in a fractionating column in an atmosphere of dry nitrogen. The first fraction totaling about 125 ml., distilled at 134° C. and gave no positive test for hydrazine. This fraction was identified as substantially pure cyclohexylamine. About 20 mls. of yellow liquid remained in the still pot. This material, which gave a strong test for hydrazine, was placed in a 50 ml. Claisen flask and was further distilled in a nitrogen atmosphere. About 10 mls. more of cyclohexylamine was removed. The material remaining in the flask was a yellow viscous liquid which solidified at about −10° C. It was insoluble in water, slightly soluble in ether, and soluble in ethyl alcohol and benzene. To identify the cyclohexylhydrazine, the impure distillation residue was treated with dilute hydrochloric acid for about an hour and was then extracted with ether. The aqueous layer was evaporated to dryness. About 2 grams of crystals were obtained, the melting point of which was 96–102° C. The melting point of cyclohexylhydrazine hydrochloride is recorded as 107–110° C.

The remainder of the cyclohexylhydrazine hydrochloride was dissolved in 30 mls. of absolute alcohol; 4 mls. of benzaldehyde and 4 mls. of concentrated hydrochloric acid were added and the solution refluxed for about 5 minutes. A white crystalline precipitate formed. It was separated by filtration, washed with hot ethyl alcohol and re-crystallized from ethyl acetate. It proved to have a melting point of 184° C. The melting point of benzylidenecyclohexylhydrazone (the contemplated product) is recorded in the literature as 183° C.

These tests show that when gaseous chloramine is passed into cyclohexylamine, the following reaction occurs:

$$NH_2Cl + 2C_6H_{11}NH_2 \rightarrow C_6H_{11}NHNH_2 + C_6H_{11}NH_3Cl \quad (4)$$

The formation of the cyclohexylamine hydrochloride rather than ammonium chloride is to be expected since cyclohexylamine is both a stronger and less volatile base than ammonia. Furthermore, this reaction is favored by the fact that cyclohexylammonium chloride precipitates from cyclohexylamine solution. It is interesting to note the cyclohexylhydrazine is apparently not as sensitive to attack by chloramine as are some of the other hydrazines.

In order to test the effect of chloramine concentrations upon yields of the cyclohexylhydrazine, a series of runs were made in the manner described above except that the chloramine was added for different periods of time. The reaction mixtures, after all the chloramine had been added, were allowed to stand and the yields of cyclohexylhydrazine were determined by analysis for chloride and hydrazine as described above. The total amount of chloramine added was ascertained by determining the chloride content of the final mixture. Hydrazine was determined by the standard method described above. The results obtained from this series of runs are shown in the following table.

Table

| Conc. $NH_2Cl$, mol/liter | Reaction time, hours | Percent yield, cyclohexylhydrazine |
|---|---|---|
| 0.0838 | 1½ | 80.0 |
| 0.0945 | 1½ | 78.4 |
| 0.127 | 1½ | 66.8 |
| 0.145 | 1½ | 70.8 |
| 0.238 | 1½ | 72.8 |
| 0.280 | 1½ | 67.5 |
| 0.175 | 18 | 65.4 |
| 0.162 | 18½ | 69.5 |

The foregoing data show that the percent yield of cyclohexylhydrazine increases with decreasing initial chloramine concentration. The reaction appears to be complete in something less than 1⅓ hours.

EXAMPLE II

Using the same technique as was followed in Example I, 150 mls. of purified piperidine ($C_5H_{10}NH$) was treated with the gaseous chloramine-ammonia mixture for 45 minutes. A solid material precipitated from the solution. Subsequent testing showed that the material was piperidine hydrochloride. After distilling out the unreacted piperidine and ammonia, about 2 mls. of a yellow oil remained in the distillation flask.

A portion of the oily residue was treated with hydrochloric acid to convert the piperylhydrazine to its hydrochloride. Re-crystallizing the product from alcohol gave white crystals which had a melting point of about 159–162° C. The recorded melting point for piperylhydrazine hydrochloride is 152° C. The remainder of the crystals were converted to the benzaldehyde derivative by the method used in Example I. The crystalline product was re-precipitated several times from alcohol by the addition of water and finally dried. It had a melting point of about 68° C. The recorded melting point for benzylidine piperylhydrazone is 68° C.

Under the foregoing conditions, a yield of about 50% based on the total chloramine used was obtained.

EXAMPLE III

Normal butylhydrazine was produced by passing the chloramine-ammonia mixture through four 100 ml. portions of liquid n-butylamine. In this case, no precipitate formed since butylamine hydrochloride is soluble in butylamine. The final reaction mixture was concentrated by distilling off the excess butylamine, which left a residue of about 20 mls. in the distillation flask. This residue consisted of n-butylamine hydrochloride and n-butylhydrazine dissolved in n-butylamine. Butylhydrazine could not be recovered from this mixture by simple distillation because butylamine is displaced from its hydrochloride by butylhydrazine and leaves a residue of butylhydrazine hydrochloride.

However, recovery of the anhydrous butylhydrazine can be accomplished by various methods such as by the addition of metallic sodium dissolved in ammonia, or by adding a stronger or less volatile base which will liberate butylhydrazine from its acid salts. This method is similar to that followed in the recovery of hydrazine from its acid salts as described in U. S. Patent No. 2,537,791.

The residue obtained from the above distillation was made basic with aqueous caustic soda and steam-distilled. A colorless, lighter-than-water liquid was obtained which was insoluble in water and ethyl ether but soluble in alcohol. The oxalate derivative was prepared and re-crystallized from alcohol. It was a white crystalline substance melting at 163–164° C. The recorded melting point of normal butylhydrazine oxalate is 165° C.

This appears to be the first time normal butylhydrazine has even been prepared.

The chloramine concentration was varied between the four samples prepared in this test. The results indicated that low initial chloramine concentrations are conducive to high yields of butylhydrazine and that the reaction is complete in something less than one hour at all concentrations. Yields as high as 60 percent of theoretical have been obtained by the procedure described above.

EXAMPLE IV

Methyl hydrazine was prepared by passing the chloramine-ammonia mixture into a body of methylamine maintained at about −25° C. by use of a Dry Ice bath. The mixture was allowed to stand for about 1 hour after the chloramine addition had been discontinued. The reaction mixture was then allowed to warm up, whereupon the ammonia and unreacted methylamine were evaporated. A small amount of liquid remaining in the reactor was washed with water, made basic with caustic soda and steam distilled.

The benzaldehyde derivative of this material was prepared and was found to have a melting point of about 99–103° C. This indicates that the product was impure tribenzalmethylhydrazine, which has a melting point of 109° C. Analysis of the product for carbon, hydrogen, and nitrogen showed that it had a composition corresponding to tribenzalmethylhydrazine.

A series of runs showed that low chloramine to methylamine ratios are conducive to high yields of product. Yields of methylamine as high as 50 percent of theoretical have been obtained by the procedure described above.

EXAMPLE V

A chloramine-ammonia mixture was passed for one hour through 50 mls. of purified aniline in a bubbler. A crystalline solid precipitated during the chloramine addition. This solid was removed from the reaction mixture by filtering and was washed with alcohol to remove impurities. Analyses showed that the material was ammonium chloride. Distillation of the reaction liquid gave one fraction boiling at 74–85° C., which appeared to be largely aniline. The remaining portion boiled over a range of 85–130° C.

It is believed that the reaction between chloramine and aniline could form phenylhydrazine, phenylenediamines and chloroanilines. The hydrochrloride, benzylidine and benzoyl derivatives were prepared and their melting points compared with the recorded melting points for the appropriate derivatives. It was shown that the reaction between chloramine and aniline produces a mixture of the three possible products. Isolation of the individual compound can be accomplished by recognized chemical procedures.

The foregoing examples illustrate a few types of the reactions of the present invention. The listing of additional examples would be surplusage since all of the nitrogen-containing compounds contemplated in the present invention would react in the manner illustrated by the foregoing examples. It is not considered necessary to list all of the individual amines, imines, amides, and imides with which the present invention is concerned.

Since the present reaction is carried out in liquid phase, it is necessary that the nitrogen-containing compound be one which can be maintained in the liquid phase under the conditions at which it is desired to operate. It is recognized that in certain instances, the liquid phase can be maintained by use of an inert solvent for the reactants. Typical solvents would be carbon tetrachloride, liquid paraffins, cycloparaffins, liquid aromatics, etc. The choice of solvent, of course, depends on the particular nitrogen compound employed.

The nitrogen-containing compound may contain various substituents so long as they do not enter into the reaction. Obviously, it would not be desirable to use a substituent which is more reactive wtih chloramine than is the hydrogen attached to the nitrogen atom. Thus, compounds which would undergo the Wurtz type reaction with chloramine would not be applicable, unless it were desired to cause the chloramine molecules to attach to the nitrogen-containing compound at two different locations.

At all times, care was taken to minimize the contact of atmospheric oxygen with the material since all of the substituted hydrazines of the present invention are subject to atmospheric oxidation.

The present invention provides a direct method of preparing a wide variety of substituted hydrazines in anhydrous condition.

We claim:

1. A method of forming an organic substituted hydrazine comprising passing an ammonia-stabilized anhydrous chloramine mixture into an anhydrous liquid amine having at least one active hydrogen capable of reacting preferentially with chloramine attached directly to the amino nitrogen selected from the group consisting of primary acyclic amines, primary alicyclic amines, secondary acyclic amines and secondary heterocyclic amines, maintaining sufficient ammonia in the reaction mixture to provide therein alkaline conditions and recovering the substituted hydrazine corresponding to the amine employed.

2. A method of forming an organic substituted hydrazine comprising providing an anhydrous chloramine gas stream stabilized by a substantial excess of ammonia, passing the chloramine-ammonia stream into an anhydrous liquid amine having at least one active hydrogen capable of reacting preferentially with chloramine attached directly to the amino nitrogen selected from the group consisting of primary acyclic amines, primary alicyclic amines, secondary alicyclic amines, secondary heterocyclic amines in the presence of a solvent which is inert with respect to both the products and reactants, maintaining sufficient ammonia in the reaction mixture to neutralize the HCl formed therein during the reaction and recovering the substituted hydrazine corresponding to the amine employed.

3. The method of claim 1 wherein the amine is a primary acyclic amine.

4. The method of claim 1 wherein the amine is n-butylamine.

5. The method of claim 1 wherein the amine is methylamine.

6. The method of claim 1 wherein the amine is a primary alicyclic amine.

7. The method of claim 1 wherein the amine is cyclohexylamine.

8. The method of claim 1 wherein the amine is a secondary acyclic amine.

9. The method of claim 1 wherein the amine is secondary butyl.

10. The method of claim 1 wherein the amine is a secondary heterocyclic amine.

11. The method of claim 1 wherein the amine is piperidine.

References Cited in the file of this patent

FOREIGN PATENTS 401,302     Great Britain _____ Oct. 30, 1933

OTHER REFERENCES

Beilstein, vol. IV, page 552 (Erste Abteilung).

Andrieth et al.: "The Chemistry of Hydrazine," pp. 28–41, John Wiley & Sons, Inc.

Klages et al.: Ann., vol. 547, pp. 1–38 (1941), in Chemical Abstracts, vol. 35, pp. 4345–4346 (1941).

Westphal: Berichte, vol. 74(B), pp. 759–776 (1941), in Chemical Abstracts, vol. 35, pp. 6568–6570 (1941).

Journal Organic Chem., vol. 14, pp. 813–818 (1949), in Chemical Abstracts, vol. 44, page 7756 (1950).